United States Patent [19]
Mumma

[11] 3,944,047
[45] Mar. 16, 1976

[54] SELECTIVE REJECT MECHANISM FOR DISCHARGING FRUIT OR THE LIKE FROM A CONVEYOR

[75] Inventor: Harold J. Mumma, Riverside, Calif.
[73] Assignee: FMC Corporation, San Jose, Calif.
[22] Filed: Dec. 18, 1974
[21] Appl. No.: 534,010

[52] U.S. Cl. ................................................. 198/25
[51] Int. Cl.² ........................................ B65G 47/00
[58] Field of Search................ 198/25, 38; 209/74 R

[56] References Cited
UNITED STATES PATENTS

| | | | |
|---|---|---|---|
| 2,756,862 | 7/1956 | Creed ............................... | 198/25 X |
| 2,939,572 | 6/1960 | Wurgaft............................ | 198/25 X |

*Primary Examiner*—Allen N. Knowles
*Attorney, Agent, or Firm*—R. S. Kelly; C. E. Tripp

[57] ABSTRACT

A selective discharge mechanism for gently, yet positively, ejecting fruit or other damageable articles from a conveyor comprised of a spaced pair of thin supporting belts. The discharge mechanism includes a pair of rotary spiders which are positioned closely adjacent to and just inside of the upper runs of the supporting belts with each spider including three relatively flexible and radially extending arms equiangularly spaced 120° apart and projecting from a central hub mounted for controlled rotary movement. A rubber abutment member is provided at the distal end of each of the arms for resilient contact with the undersurface of a fruit on the conveyor. The discharge mechanism is selectively triggered by signals which signify the approach of a fruit, and such signals may cause one of the spiders to be rotated through 120° to permit one of its projecting abutment members to flexibly engage the lower undersurface of the fruit and deflect the fruit laterally from the conveyor in the desired discharge direction.

11 Claims, 6 Drawing Figures

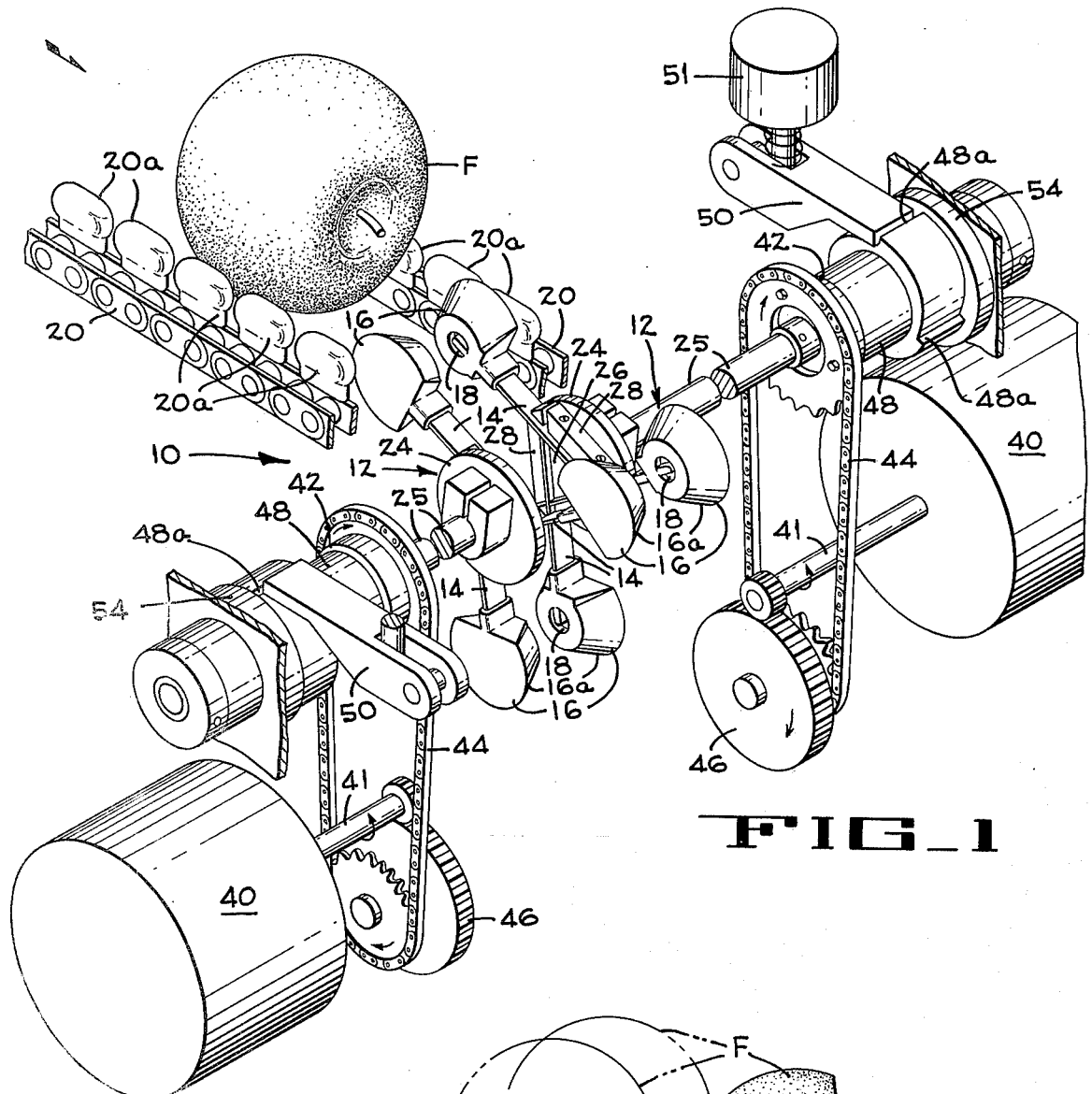
FIG_1
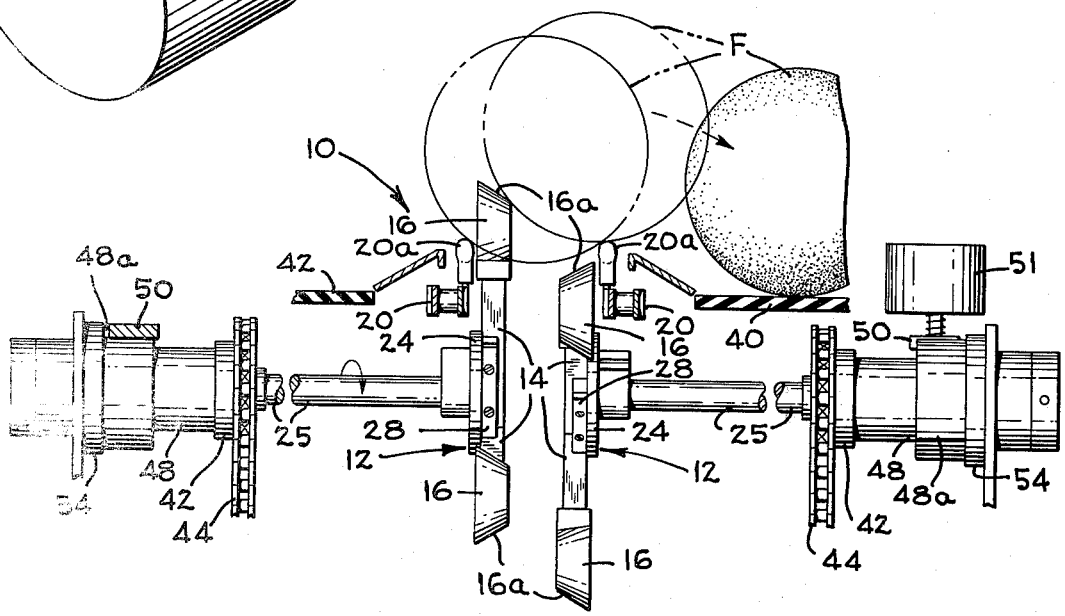
FIG_3

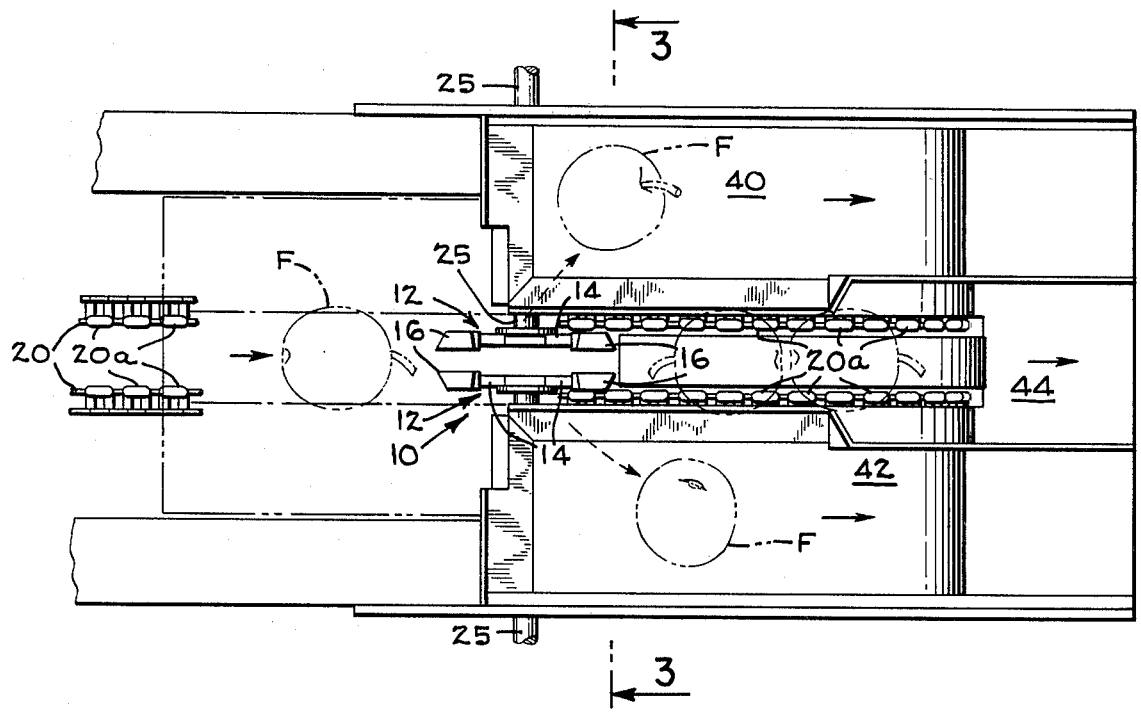
FIG_2
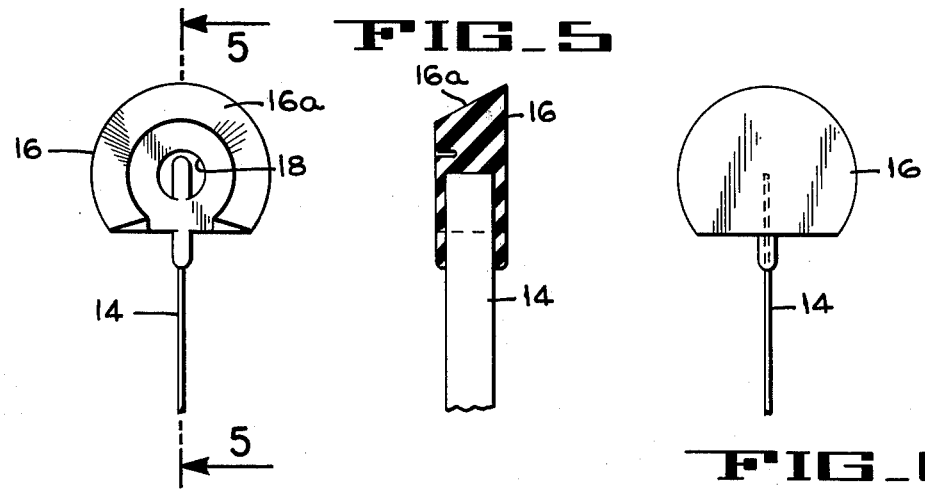
FIG_5
FIG_4
FIG_6

SELECTIVE REJECT MECHANISM FOR DISCHARGING FRUIT OR THE LIKE FROM A CONVEYOR

BACKGROUND OF THE INVENTION

1. Field of the Invention

The present invention pertains to conveyor sorting systems, and more particularly, it pertains to reject mechanisms for selectively rejecting articles such as fruit from a conveyor.

2. Description of the Prior Art

In various commercial enterprises relatively fragile articles of different types are conveyed through sorting systems wherein selectively actuated mechanisms are utilized to divert the articles into separate sorting or conveying lanes in accordance with certain qualities or characteristics of the articles. For example, the fresh fruit and vegetable packing industry is one such enterprise wherein easily bruised or otherwise damageable fruit must be sorted and diverted into different processing lanes in accordance with certain inherent characteristics of the fruit (e.g., color, size, etc.). Heretofore, it has been the practice in this industry to use the conventional and time honored methods and means for diverting the fruit from their carrying conveyors despite the rather obvious inadequacies of such methods in certain situations.

For example, probably the most widely used method of diverting singulated articles when such articles are moving in a generally horizontal path on a conveyor involves the use of a pivotable arm which can be selectively actuated to swing from a position out of the path of the articles into an obstructing position over the conveyor to thereby intercept the selected article and deflect it laterally from the conveyor. While this "baseball bat" approach to diverting articles from a conveyor has its obvious advantages in simplicity and reliability, it leaves much to be desired when the articles are fragile and easily damaged (e.g., when the articles are fruit or vegetables) and/or when the articles are moving at a relatively high rate of speed. Prior art patents which teach this primitive method of selective article diversion include the U.S. Pat. Nos. to Driesch et al 3,198,308; Dodge 2,455,741; and Lowe 2,451,104.

An improved article diverting means for fragile articles is provided by air jets which can be selectively operated to direct blasts of air laterally against the moving articles so as to divert them off of their conveying means--such apparatus being shown, for example, in the prior U.S. Pat. Nos. to Bartlett 2,881,919 or Simmons 3,327,850. The problem with the air blast type of diverter, in addition to its relatively high cost, is that where the articles are heavy and occupy a stable position upon the conveying means a rather forceful jet of air is needed in order to accomplish the deflection. This can create difficulties if the article has "soft spots" which are susceptible to concentrated forces. For example, apples (which is a fruit that is typically mechanically sorted during grading or pregrading operations) may have soft spots occasioned by bruises or microbial infection which if subjected to a concentrated air blast would not only result in the destruction of the apple but also in the creation of a disagreeable mess on and about the conveying machinery so as to necessitate a costly stopping of such machinery for the institution of clean-up procedures.

A recently devised mechanism for diverting fruit or the like from a horizontally arranged conveyor is disclosed in the U.S. Pat. No. to Greenwood et al 3,770,111, which issued on Nov. 6, 1973. This mechanism utilizes the aforediscussed air blast devices but, in addition, includes a pair of vertically upwardly movable plungers which are selectively activated to engage the lowermost surface of a fruit as it passes thereover to deflect it laterally of its supporting conveyor surface. While the mechanism disclosed in the Greenwood et al patent constitutes an improvement over the aforedescribed more conventional prior art mechanisms, such device still operates under the same general concept as that of the prior art mechanisms, i.e., the concept of moving a rigid member in a direction so as to intercept a moving article to thereby institute a collision which deflects the article from its original course. Thus, such mechanism is ultimately plagued with the attendant control and fruit damage problems of the other prior art diverter mechanisms.

SUMMARY OF THE INVENTION

With the selective reject mechanism of the present invention a means is provided which gently, yet positively, tilts easily damageable articles, such as fruit, from a horizontally arranged conveyor to thereby divert them in the desired direction. Although such reject mechanism is simple in concept, and therefore economical to manufacture, it provides results which are clearly superior to those provided by the aforediscussed prior art devices and thereby constitutes a noted advance in the relatively neglected art of selective reject mechanism.

The apparatus of the present invention basically comprises a rotary arm which has a resilient abutment member at one end thereof and includes means for selectively rotating the arm in a plane adjacent to a conveyor surface so that the abutment member will sweep into contact with the selected article on the conveyor, which is moving in the same direction as the abutment member, to resiliently nudge such article off of the conveyor surface. In the preferred embodiment of the invention the rotary arm is positioned beneath the conveyor surface so that the abutment member sweeps upwardly from a position just below the conveying plane to engage the undersurface of the article and to then lift and tilt the article off of the conveyor. The timing and speed of the moving arm can be adjusted to the speed of the article on the conveyor so that the arm will strike the article with a minimum amount of force.

BRIEF DESCRIPTION OF THE DRAWINGS

FIG. 1 is an isometric view of the selective reject mechanism of the present invention illustrating its positioning with respect to an overlying fruit carrying conveyor from which it is desired to selectively divert fruit.

FIG. 2 is a plan of the reject mechanism of FIG. 1 as utilized in an environment where it can selectively discharge fruit from the fruit carrying conveyor to either one of two laterally positioned conveyors.

FIG. 3 is an enlarged section taken generally along the line 3—3 of FIG. 2 and further illustrates the manner in which a fruit is deflected to a selected one of the laterally positioned conveyors.

FIG. 4 is a rear elevation of one of the diverting arms and its abutment member.

FIG. 5 is a transverse section taken on the line 5—5 of FIG. 4.

FIG. 6 is a front elevation of one of the diverting arms and its abutment member.

DESCRIPTION OF THE PREFERRED EMBODIMENT

The selective reject mechanism 10 of the present invention is shown in FIG. 1 of the drawings and will be seen to generally comprise a spaced pair of rotatable spiders 12 each of which includes three equiangularly spaced diverting arms 14 having enlarged resilient abutment members 16 molded or otherwise securely attached to the outer ends thereof. The spiders are each individually mounted for selective rotation so that an abutment member of a selected one of the spiders may engage a fruit F carried by conveyor chains 20 and divert the fruit to the proper laterally positioned conveyor belt 40 or 42, as shown in FIGS. 2 and 3.

Each of the spiders will be seen to include a central hub 24 which is clamped onto a drive shaft 25 arranged (by means to be disclosed presently) for selective rotation through 120° angular increments. One side of the hub 24 is provided with a triangularly shaped mounting block 26 (FIG. 1) and three additional mounting blocks 28 positioned about the side faces of the mounting block 26 in parallel spaced relationship. The diverting arms 14, which comprise thin, blade-shaped members (FIGS. 4-6), are each positioned between one face of the block 26 and one of the mounting blocks 28 and are rigidly secured in position by means of set screws inserted through the outer mounting blocks 28. Obviously, the radial positioning of the arms may be adjusted by releasing the set screws so as to permit the abutment member 16 to project from the spider at different radial distances. Thus, if the size or shape of the fruit carried by the conveyor chains 20 should be varied, the diverting arms can be readily adjusted to accommodate the new fruit.

The resilient abutment member 16 is shown in detail in FIGS. 4, 5 and 6. This key element of the present invention is arranged to engage the fast moving fruit F in a gentle manner so as not to cut or bruise it while at the same time providing the positive impetus which alters the direction of movement of the fruit and sends it in the new, desired direction. The abutment member will be seen to be generally frusto-conical in shape (FIG. 5) and includes an inclined outer surface 16a for engagement with the fruit. The tapered configuration of the abutment member at this engagement surface permits the abutment member to deflect when it engages the fruit while at the same time providing the resilient deflecting force. A recess 18 is provided in one face of the abutment member, and a similar recess (not shown) may be provided in the opposite face of the abutment member, if desired, in order to provide for a greater deflection upon engagement with the fruit so as to lessen the chances of injury to the fruit.

The fruit sorting conveyor arrangement shown in the drawings is essentially that shown in the fruit sorting apparatus described in the aforementioned U.S. Pat. No. 3,770,111 to Greenwood et al, and reference to such patent may be had for a detailed description of the fruit sorting conveyor arrangement, it being recognized that the details of such conveyor arrangement are not in any way critical to an understanding of the present invention. Briefly, the sorting conveyor arrangement, in addition to the conveyor belts or chains 20, includes the endless belt conveyors 40 and 42 which are positioned parallel to and on opposite sides of the conveyor chains for receiving the fruit which is deflected therefrom (FIG. 2). Also, an inclined chute 44 is arranged to receive that fruit which is not deflected by the selective reject mechanism 10 of the present invention and which is carried by the conveyor chains 20 straight through the deflecting station. As shown, the conveyor chains 20 include special rubber-covered projections 20a (FIG. 1) which form the two spaced belts for supporting the fruit, and such belts are spaced far enough apart so as to provide a relatively stable support surface for the fruit (FIG. 3). As also shown in FIG. 3, each of the spiders 12 is mounted so as to rotate in a plane located just inside of one of the conveyor chains 20 so that when a spider is activated it will engage one side of the undersurface of a fruit in order to cause the ejection of such fruit to the opposite side of the conveyor. It will be understood that appropriate means upstream of the deflection station, as shown for example in the aforedescribed U.S. Pat. No. 3,770,111 to Greenwood et al, can be utilized to determine the characteristics (e.g., the color) of each of the fruit F on the conveyor chains 20. Such detection means then can be operated to send a signal to the reject mechanism 10 to activate one of the spiders 12 when it is desired to deflect a particular fruit to one of the laterally located conveyors 40 and 42.

Each of the spiders 12 is provided with individual, selectively operable drive means so that it can be selectively rotated through its 120° angular increments. Such drive means includes a drive motor 40 having an output shaft 41 which, by means of a drive chain 44 and a gear 46 (FIG. 1), is adapted to continuously rotate a hub 42 that is rotatably mounted upon the spider drive shaft 25. The hub 42 is part of a conventional incremental rotation control package which is arranged to be secured about the projecting end of the spider drive shaft 25. These rotation control packages comprise clutch-brake mechanisms which are entirely conventional and which will be described only briefly herein. In general, the continuously rotating hub 42 includes a sleeve received within a clutch spring (not shown) which is secured at one end thereof to an encompassing stop collar 48. The stop collar includes three radially extending abutment surfaces 48a spaced 120° apart. When the stop collar is held from rotating by means of a pivotable lever arm 50 controlled by a solenoid 51, the drive shaft 25 (which is connected to the other end of the clutch spring) is released to the clutch spring is unwound. However, when the solenoid 51 is actuated to raise the lever arm 50 the stop collar 48 is released allowing the clutch spring to wrap down on the sleeve of the input hub 42 and thus provide an immediate drive connection to the drive shaft 25. The solenoid 51 is only very briefly energized so that the lever arm 50 is immediately released and allowed to slide on the surface of the stop collar 48 until it again engages one of the abutment surfaces 48a to prevent the stop collar from turning thereby unwinding the clutch spring to disconnect the drive to the drive shaft 25. Simultaneously with the foregoing, a fixed brake plate 54 at the end of the shaft is brought into braking engagement with the drive shaft 25 by means of another drive spring arrangement (not shown) that interconnects the stop collar, drive shaft and brake plate and that works in the opposite manner from the aforedescribed clutch spring. Such arrangement serves to stop the rotation of the drive shaft within milliseconds of the energization of the solenoid 51. As pointed out hereinbefore, such industrial clutch-brake units for small loads are readily available and can provide accurate stopping of a drive shaft within plus or minus one-half degree of any desired point at cycling rates as fast as 1200 per minute. One such unit which can be used with the selective reject mechanism of the present invention is Model CB-4 manufactured by Precision Specialties Inc. of Pitman, New Jersey.

By adjusting the speed of the motors 40, the linear speed of the abutment members in the plane of the fruit conveyor can be adjusted so that they will move just slightly faster than the average speed of the fruit F on the conveyor belts so that the impact force of the abutment members with the fruit is minimized to, in turn, minimize the possibility of damage to the fruit.

When the mechanism of the present invention is operating, the individual fruit F is conveyed by the conveyor chains 20 in spaced arrangements in a linear direction as shown in FIG. 2. By suitable decisions (made upstream from the deflection station) each fruit is marked for one of three ultimate destinations: (1) it can continue in its linear path to the discharge chute 44 (in which case neither of the spiders 12 will be energized); (2) it can be deflected to the left to conveyor 40 (in which case the right-hand spider will be activated to rotate through its 120° increment); or (3) it can be deflected to the right to conveyor 42 (in which case the left-hand spider will be activated to rotate through its 120° increment). If the decision is made to shift the fruit F to either conveyor 40 or conveyor 42, this information is utilized to provide energization of the appropriate solenoid 51 which briefly pivots its associated lever arm 50 upwardly to disengage it from an abutment surface 48a on the stop collar 48. The solenoid is almost immediately de-energized so that the lever arm will drop back down on the stop collar to engage the next abutment surface 48a after 120° of angular rotation. Through appropriate means for timing the energization of the solenoid 51 with the position of the selected fruit on the conveyor belts 20 (the details of which are not relevant to the present invention), the abutment member 16 of the appropriate diverting arm 14 will move to overtake the fruit and gently nudge it to its desired final destination.

From the foregoing description it can be seen that the simple, and yet highly effective, mechanism of the present invention is capable of operation at high processing speeds allowing fruit such as apples to be deflected at conveyor speeds which are far faster than any which could be accommodated by the human operator. Yet, even with very fragile fruit moving at such high speeds, the mechanism of the present invention provides gentle deflection without bruising or otherwise injuring the fruit. The mechanism operates quickly and efficiently and will seldom need repairs or adjustment. Thus, while the ultimate consumer of the apples which are selectively sorted with the aforedescribed invention may have no knowledge or appreciation of such device, in the frozen winters of the Yakima or Shenandoah Valleys, the mechanism of the present invention will unobtrusively cycle on to provide an important step in the ultimate mass movement of fruit into the marketplace.

Although the best mode contemplated for carrying out the present invention has been herein shown and described, it will be apparent that modification and variation may be made without departing from what is regarded to be the subject matter of the invention.

What is claimed is:

1. A discharge mechanism for diverting an article off a generally horizontally arranged conveyor, said mechanism comprising a diverting arm which includes a resilient abutment member at one end thereof, rotary mounting means connected to the other end of said arm for mounting said arm for rotary movement about an axis extending generally transversely to the direction of movement of said conveyor wherein said arm is arranged to rotate in a generally vertical plane lying adjacent to one edge of said conveyor and extending generally parallel to said conveyor, means for rotating said arm through a predetermined angular distance so that the portion of the arm which moves in the plane of the conveyor is moved in the direction of movement of the conveyor and in a path so as to cause said abutment member to strike an article on the conveyor when said arm portion is moving in the direction of movement of the conveyor, means for automatically stopping the movement of said arm after it has moved through said predetermined angular distance, and means for selectively actuating said arm rotating means so as to cause said abutment member to move through said predetermined angular distance and engage one side of said article on the conveyor and thereby cause the article to be deflected off the other edge of said conveyor.

2. A discharge mechanism according to claim 1 wherein said rotary axis of the diverting arm extends below the plane of the conveyor so that said abutment member engages the undersurface of said article.

3. A discharge mechanism according to claim 1 wherein said diverting arm comprises a thin blade and wherein said abutment member comprises an enlarged member of rubberlike material secured to said one end of the blade.

4. A discharge mechanism according to claim 2 wherein said abutment member is comprised of rubberlike material and includes an annular surface arranged to engage said article.

5. A discharge mechanism according to claim 4 wherein said annular surface is a frusto-conical surface.

6. A discharge mechanism according to claim 1 comprised of a plurality of said diverting arms equiangularly spaced about said rotary axis, said arm rotating means being arranged to rotate and diverting arms during each actuation of said mechanism by an angular distance equal to the angle between an adjacent pair of said arms.

7. A discharge mechanism according to claim 6 wherein said rotary axis of the diverting arms extends below the plane of the conveyor and wherein said abutment members lie below the plane of the conveyor in the unactuated position of said mechanism whereby one of the abutment members will move in an arcuate path above the plane of the conveyor to engage the undersurface of said article during each actuation of said mechanism.

8. A discharge mechanism for use with a conveyor which includes a pair of spaced belts for transporting articles supported across said belts along a generally horizontal path, said mechanism comprising a diverting arm which includes a resilient abutment member at one end thereof, means mounting one end of said arm for rotary movement of the arm about an axis extending generally transversely to the direction of movement of said conveyor wherein said arm is arranged to rotate in a generally vertical plane lying adjacent to one of said belts and extending generally parallel to said belts, means for rotating said arm through a predetermined angular distance so that the portion of the arm which moves in the plane of the conveyor is moved in the direction of movement of the conveyor and in a path so as to cause said abutment member to strike an article on the conveyor when said arm portion is moving in the direction of movement of the conveyor, means for automatically stopping the movement of said arm after it has moved through said predetermined angular distance, and means for selectively actuating said arm rotating means to cause said abutment member to move through said predetermined angular distance and engage one side of said article on the conveyor adjacent said one belt and thereby cause the article to be deflected off the conveyor adjacent the other belt.

9. A discharge mechanism according to claim 8 wherein said rotary axis of the diverting arm extends below the plane of the conveyor so that said abutment member engages the undersurface of said article.

10. A discharge mechanism according to claim 9 comprised of a plurality of said diverting arms equiangularly spaced about said rotary axis, said arm rotating means being arranged to rotate said diverting arms during each actuation of said mechanism by an angular distance equal to the angle between an adjacent pair of said arms.

11. A discharge mechanism according to claim 9 wherein said diverting mechanism comprises a pair of diverting arms each being mounted adjacent a corresponding one of said conveyor belts, said rotary axis being common to both of said arms, and said actuating means being arranged to selectively actuate one of said diverting arms to divert said article from the conveyor.

* * * * *

UNITED STATES PATENT OFFICE
CERTIFICATE OF CORRECTION

PATENT NO. : 3,944,047
DATED : March 16, 1976
INVENTOR(S) : HAROLD J. MUMMA

It is certified that error appears in the above-identified patent and that said Letters Patent are hereby corrected as shown below:

Column 4, line 48, "to" should be --as--.

Signed and Sealed this

Sixteenth Day of November 1976

[SEAL]

Attest:

RUTH C. MASON
*Attesting Officer*

C. MARSHALL DANN
*Commissioner of Patents and Trademarks*